(12) United States Patent
Dong et al.

(10) Patent No.: US 7,793,898 B2
(45) Date of Patent: Sep. 14, 2010

(54) DISPLAY DEVICE HAVING ROTATING APPARATUS FOR DISPLAY PANEL

(75) Inventors: Shao-Ren Dong, Shenzhen (CN); Bin Huang, Shenzhen (CN); Chih-Huang Lien, Miao-Li (TW)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 136 days.

(21) Appl. No.: 12/215,876

(22) Filed: Jun. 30, 2008

(65) Prior Publication Data

US 2009/0001239 A1    Jan. 1, 2009

(30) Foreign Application Priority Data

Jun. 29, 2007    (TW) .............................. 96123679 A

(51) Int. Cl.
*F16M 11/00*    (2006.01)
(52) U.S. Cl. ........................ 248/157; 248/404; 248/917
(58) Field of Classification Search ......... 248/917–923, 248/176.1, 121, 122.1
See application file for complete search history.

(56) References Cited

U.S. PATENT DOCUMENTS

| | | | |
|---|---|---|---|
| 6,095,476 A * | 8/2000 | Mathis | 248/422 |
| 6,312,270 B1 | 11/2001 | Hamon | |
| 6,655,645 B1 * | 12/2003 | Lu et al. | 248/176.1 |
| 7,168,665 B2 | 1/2007 | Hong et al. | |
| 7,621,490 B2 * | 11/2009 | Tseng | 248/157 |
| 2006/0171105 A1 * | 8/2006 | Hsiao | 361/681 |
| 2006/0175476 A1 * | 8/2006 | Hasegawa et al. | 248/125.1 |
| 2007/0205341 A1 * | 9/2007 | Chih et al. | 248/125.9 |

FOREIGN PATENT DOCUMENTS

CN    1467753 A    1/2004

* cited by examiner

*Primary Examiner*—Amy J Sterling
(74) *Attorney, Agent, or Firm*—Wei Te Chung

(57) ABSTRACT

An exemplary display device includes a display panel and a rotating apparatus. The rotating apparatus includes a first spindle assembly, a conveyor connecting to the first spindle assembly, and a second spindle assembly. The first spindle assembly includes a first spindle configured to synchronously rotate with rotation of the display panel. The second spindle assembly includes a second spindle meshed with the first spindle, and is configured to be able to rotate and simultaneously rise or fall along the connecting assembly.

20 Claims, 11 Drawing Sheets

DISPLAY DEVICE HAVING ROTATING APPARATUS FOR DISPLAY PANEL

CROSS-REFERENCE TO RELATED APPLICATION

This application is related to, and claims the benefit of, a foreign priority application filed in Taiwan as Serial No. 096123679 on Jun. 29, 2007. The related application is incorporated herein by reference.

FIELD OF THE INVENTION

The present invention relates to a display device that includes a display panel and a neck having a rotating apparatus, such that the display panel is rotatable in a predetermined plane.

GENERAL BACKGROUND

Referring to FIG. 12, a typical display device 4 includes a display panel 42, a neck 44, and a base 46. The neck 44 is integrally formed with the base 46, and is connected with the display panel 42 by a pivot axis 48. The display panel 42 and the neck 44 are supported by the base 46, and can be rotated around the pivot axis 48.

It is widely held that a healthy position for a user to view a screen of the display panel 42 is such that a horizontal centerline of the display panel 42 is slightly below a horizontal line of sight of the user. However, the display device 4 is not configured to be readily adjustable to achieve this desired position. It can be troublesome and time-consuming for the user to try to adjust a working height of the display panel 42 of the display device 4. Further, the display panel 42 cannot be rotated in a plane substantially perpendicular to the base 46.

What is needed, therefore, is a display device that can overcome the above-described deficiencies.

SUMMARY

In an exemplary embodiment, an exemplary display device includes a display panel and a rotating apparatus. The rotating apparatus includes a first spindle assembly, a conveyor connecting to the first spindle assembly, and a second spindle assembly. The first spindle assembly includes a first spindle configured to synchronously rotate with rotation of the display panel. The second spindle assembly includes a second spindle meshed with the first spindle, and is configured to be able to rotate and simultaneously rise or fall along the connecting assembly.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
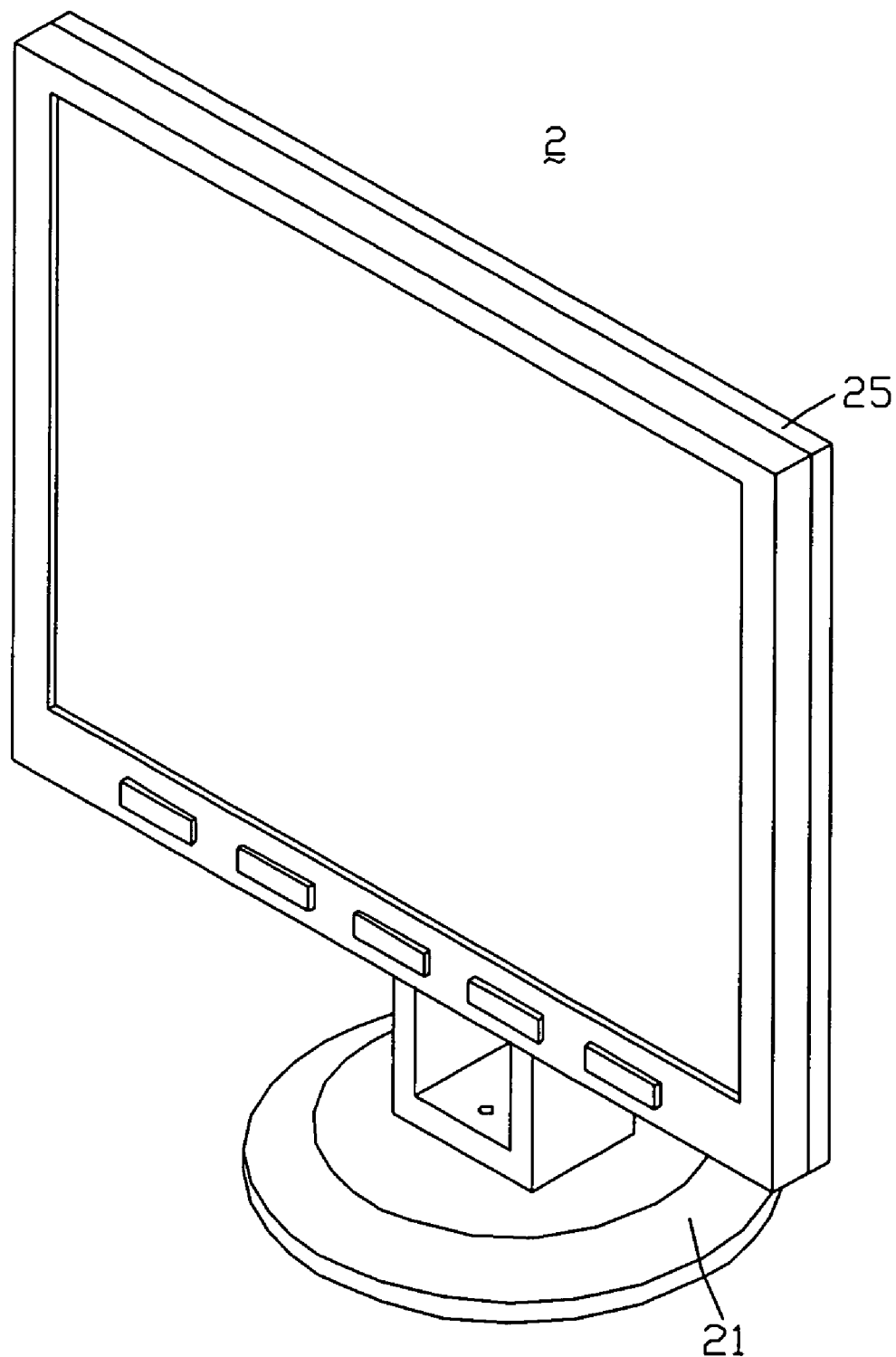
FIG. 1 is an isometric view of a display device according to an exemplary embodiment of the present invention, the display device including a display panel, a neck, and a supporting base.
Figure 2:
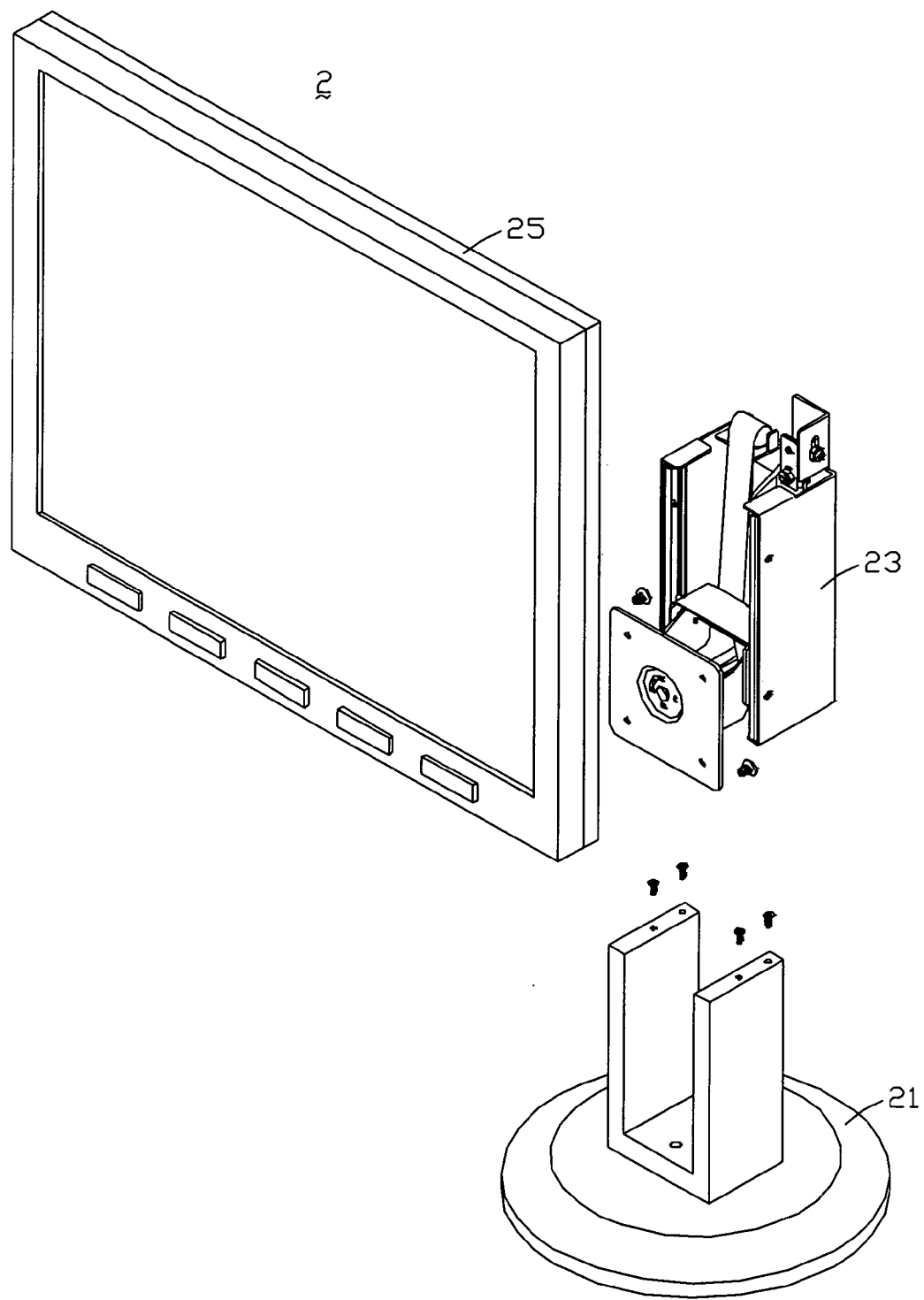
FIG. 2 is an exploded view of the display device of FIG. 1.
Figure 3:
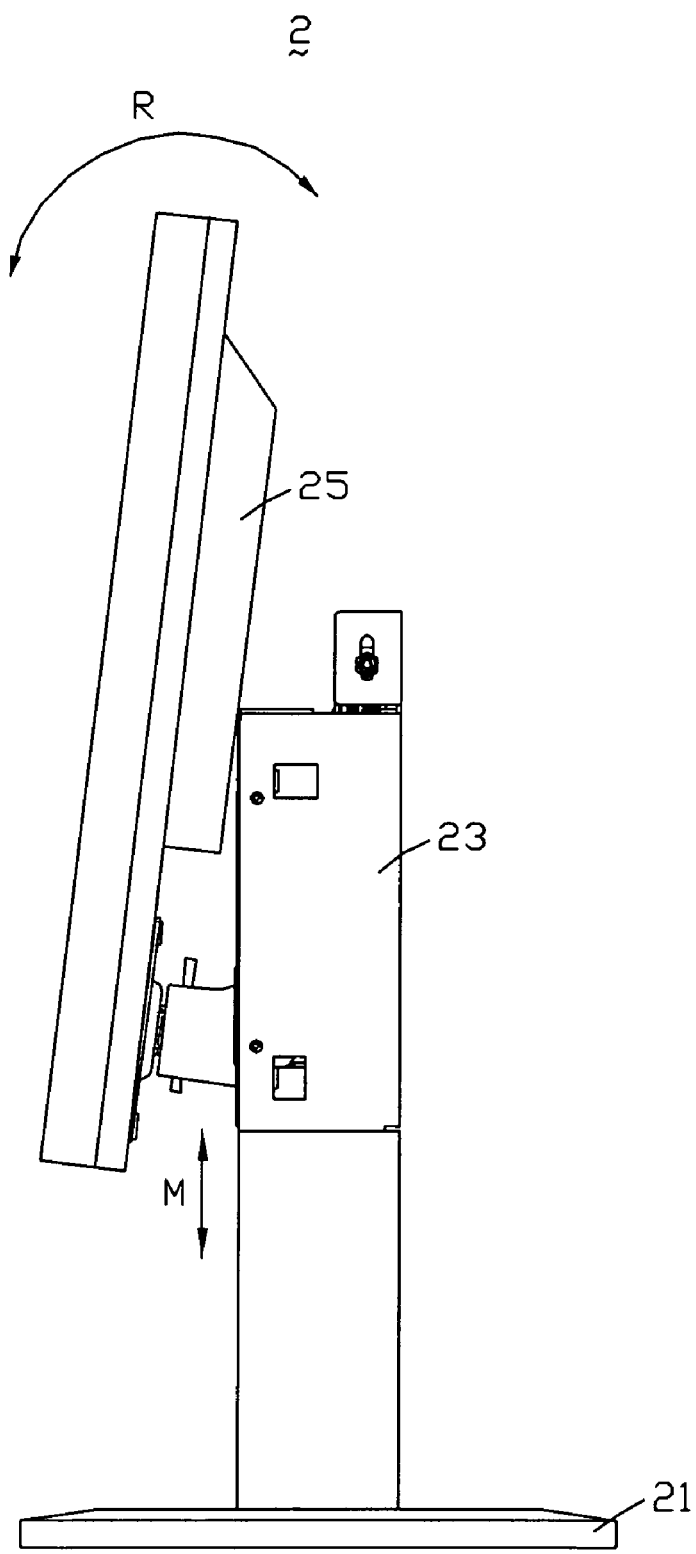
FIG. 3 is a side plan view of the display device of FIG. 1, showing that the display panel can be moved up or down, and back or forth relative to the supporting base.
Figure 4:
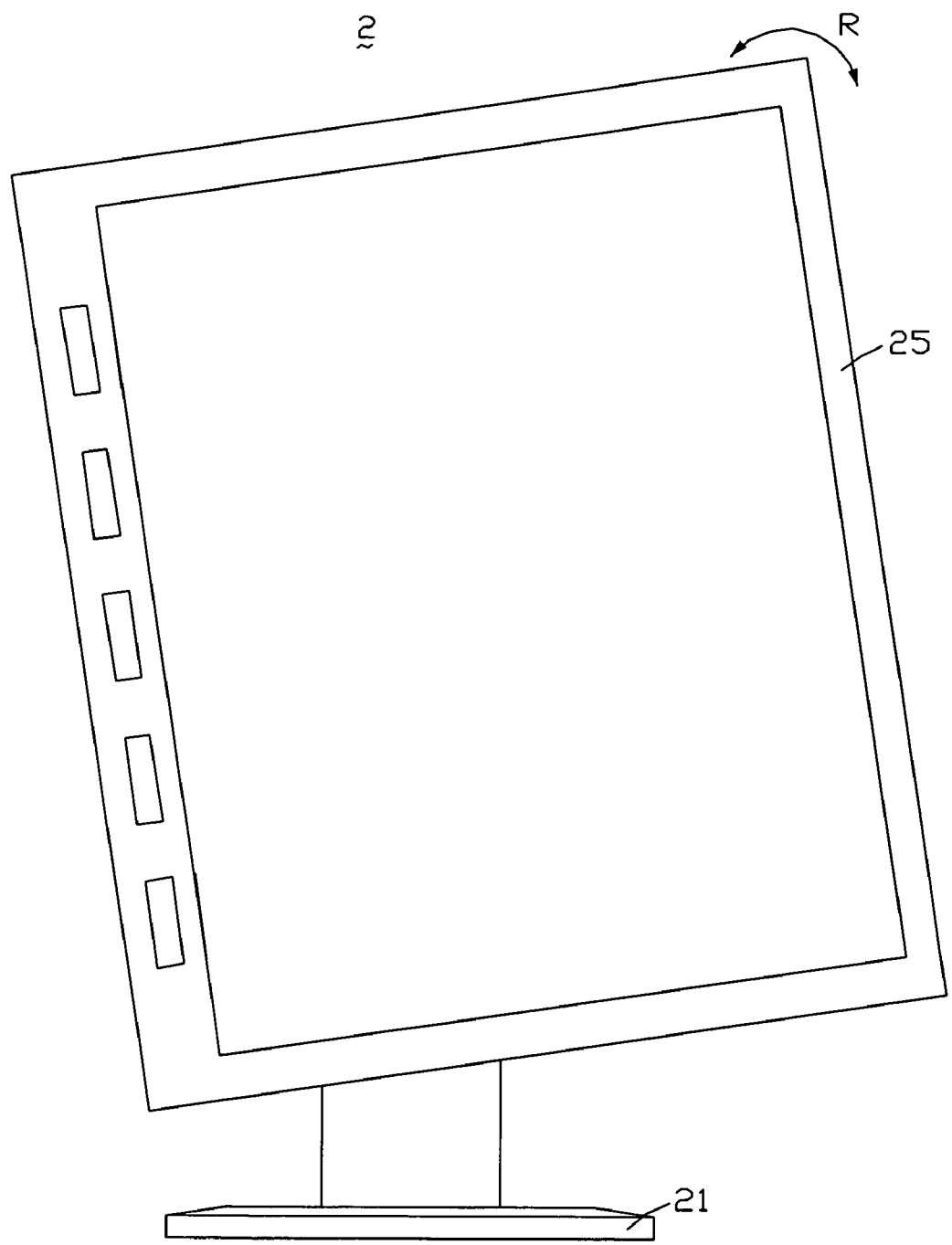
FIG. 4 is a front plan view of the display device of FIG. 1, showing that the display panel can be rotated in a plane substantially perpendicular to the supporting base.

Referring to FIG. 1 and FIG. 2, a display device 2 according to an exemplary embodiment of the present invention is shown. The display device 2 includes a supporting base 21, a neck 23, and a display panel 25. The supporting base 21 supports the neck 23 and the display panel 25. The neck 23 interconnects the display panel 25 and the supporting base 21. Referring also to FIG. 3 and FIG. 4, the neck 23 is configured for allowing the display panel 25 to be moved up or down, pivoted back or forth relative to the supporting base 21 (as shown in FIG. 3), and rotated in a plane substantially perpendicular to the supporting base 21 (as shown in FIG. 4), as desired.

Figure 5:
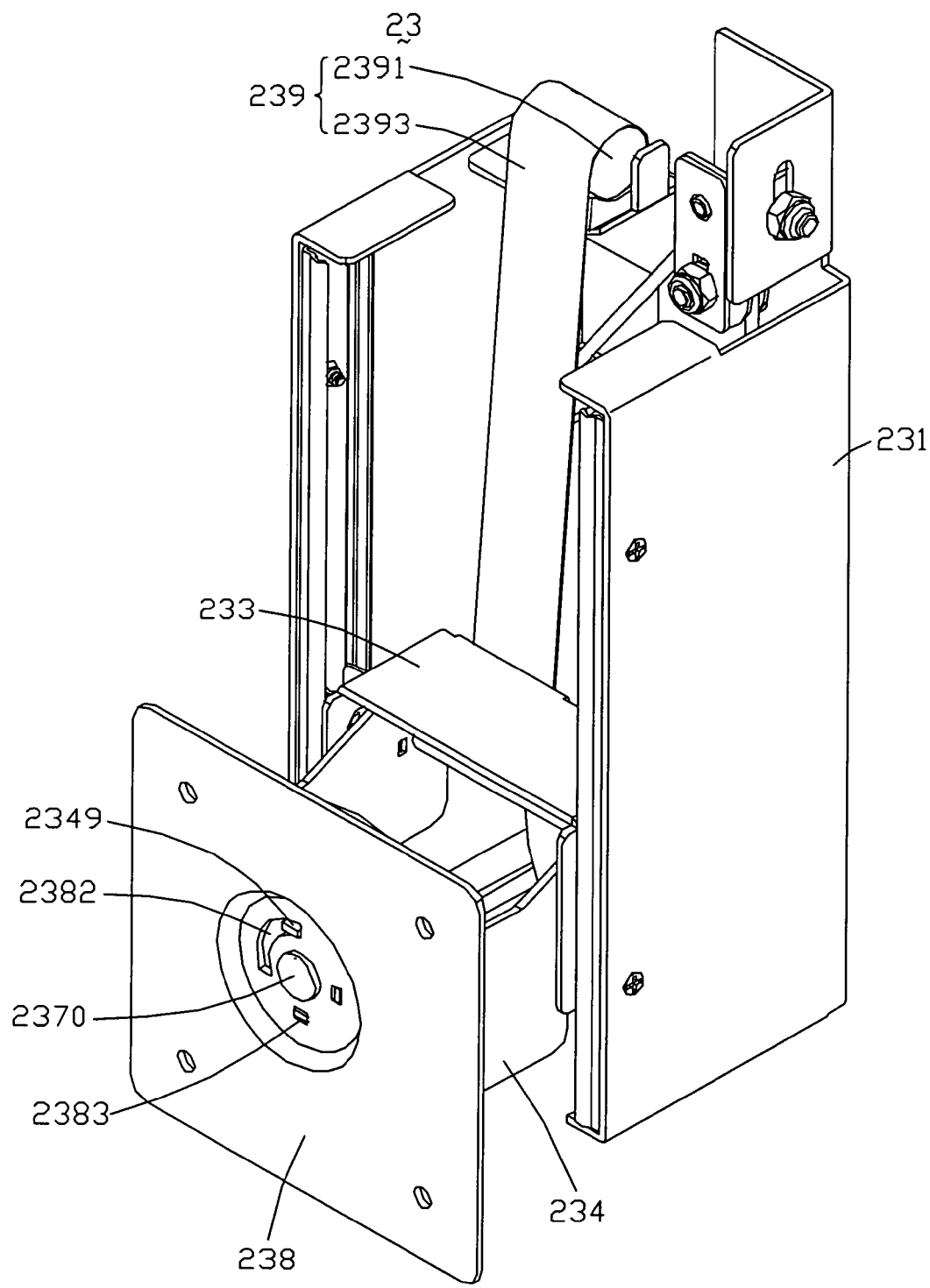
FIG. 5 is an enlarged view of the neck of FIG. 2, the neck including a lifter.
Figure 6:
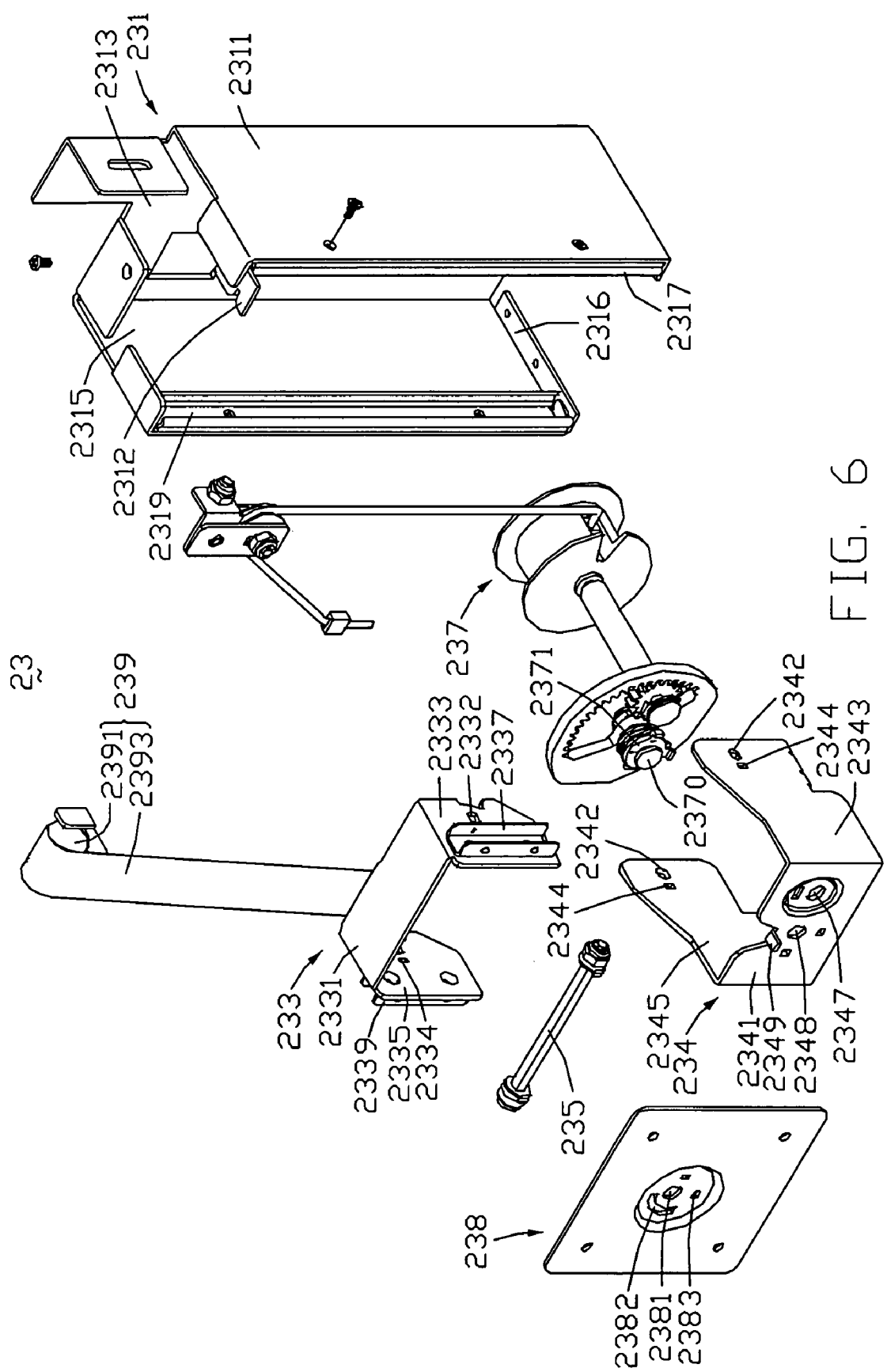
FIG. 6 is an isometric, exploded view of the neck of FIG. 5, the neck further including a first sliding stand, a hinge, a second tilting stand, and a rotating apparatus.

Referring also to FIG. 5 and FIG. 6, the neck 23 includes a supporting stand 231, a first sliding stand 233, a second tilting stand 234, a hinge 235, a rotating apparatus 237, a locking stand 238, and a lifter 239.

The supporting stand 231 includes a first side plate 2311, a second side plate 2313, a third side plate 2315, and two bottom plates 2316. The first side plate 2311 and the third side plate 2315 are located at two opposite sides of the supporting stand 231, and are interconnected by the second side plate 2313. The bottom plates 2316 are connected with the first side plate 2311 and the third side plate 2315, respectively. A first blocking strip 2312 inwardly extends from the second side plate 2313. The supporting stand 231 further includes a first sliding guide 2317 fixed at an inner surface (not labeled) of the first side plate 2311, and a second sliding guide 2319 fixed at an inner surface (not labeled) of the third side plate 2315.

Figure 7:
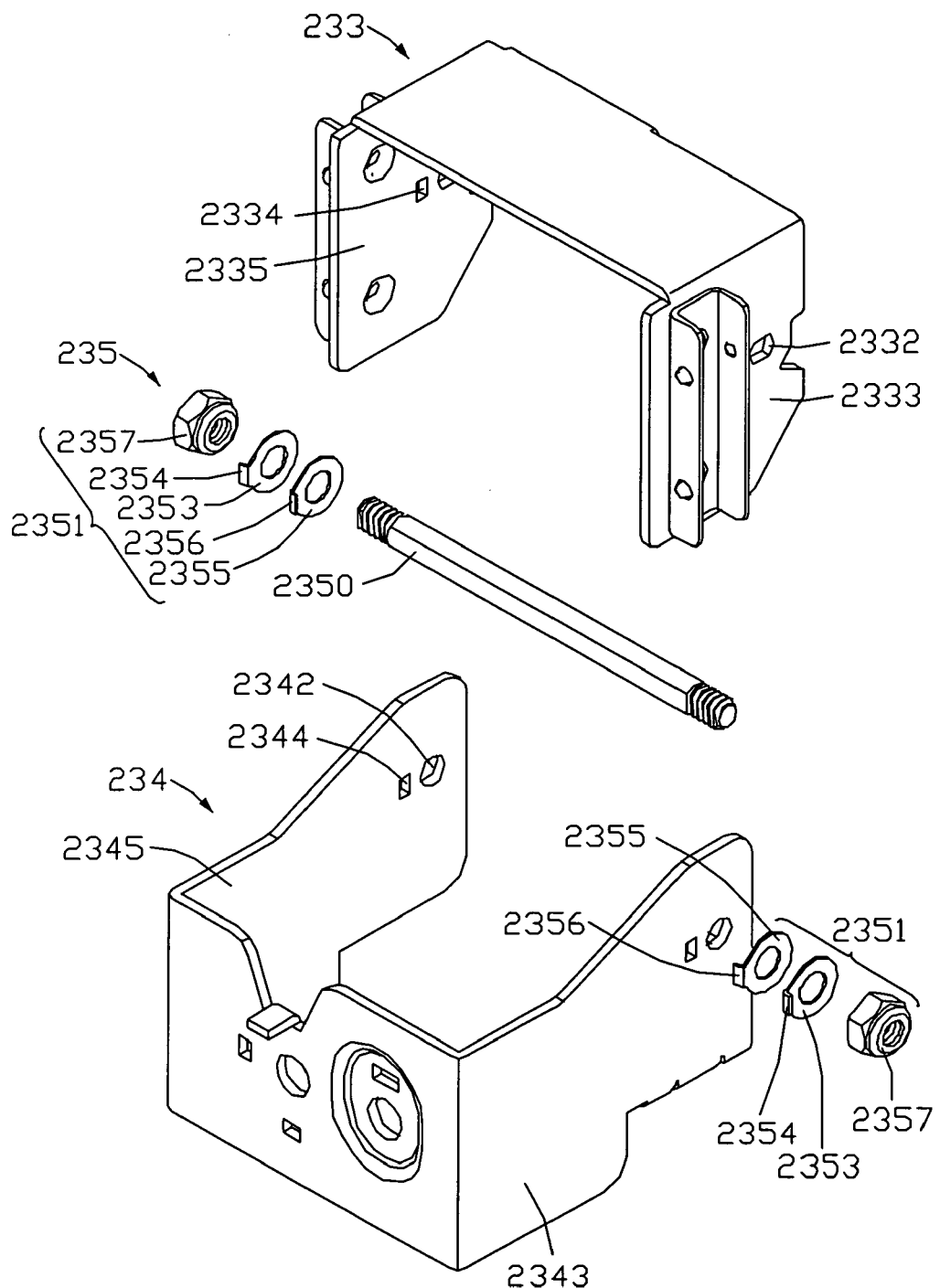
FIG. 7 is an enlarged view of the first sliding stand, the hinge, and the second tilting stand of FIG. 6.

Referring also to FIG. 7, the first sliding stand 233 is configured to be received in the supporting stand 231, and includes a top board 2331, a first side board 2333, a second side board 2335, a first sliding arm 2337, and a second sliding arm 2339. The first side board 2333 and the second side board 2335 are located at two opposite sides of the first sliding stand 233, and are interconnected by the top board 2331. The first sliding arm 2337 is fixed at an outer surface (not labeled) of the first side board 2333, and is configured to slide along the first sliding guide 2317. The second sliding arm 2339 is fixed at an outer surface (not labeled) of the second side board 2335, and is configured to slide along the second sliding guide 2319. Each of the first side board 2333 and the second side board 2335 includes a first flat through hole 2332 and a first flat fixing hole 2334 defined therein, respectively.

The lifter 239 includes a roller 2391 and a belt 2393. The roller 2391 is positioned at a top end of the lifter 239 far from the bottom plates 2316. The belt 2393 includes one end fixed to the roller 2391, and the other end fixed to the top board 2331 of the first sliding stand 233. Typically, the roller 2391 is spring-loaded. Thereby, when the roller 2391 is rotated in a first direction such that the belt 2393 extends further out from the roller 2391, the roller 2391 elastically resists such rotation. The amount of resistance increases with increasing extension of the belt 2393 out from the roller 2391. In one alternative embodiment, the belt 2393 can be an elastically deformable (stretchable and recoverable) belt.

The second tilting stand 234 is configured to be received between the first side board 2333 and the second side board 2335 of the first sliding stand 233. The second tilting stand 233 includes a first side wall 2343 corresponding to the first side board 2333, a second side wall 2345 corresponding to the second side board 2335, and a front wall 2341 interconnecting the first side wall 2343 and the second side wall 2345. Each of the first side wall 2343 and the second side wall 2345 defines a second rounded through hole 2342 corresponding to the first flat through hole 2332, and a second flat fixing hole 2344 corresponding to the first flat fixing hole 2334, respectively. The front wall 2341 includes a second blocking strip 2349 outwardly extending from a main body thereof, and a third rounded through hole 2347 and a fourth rounded through hole 2348 defined in the main body, respectively.

The hinge 235 includes a first spindle 2350, and two screw cap assemblies 2351 configured to be threadedly engaged to two opposite ends (not labeled) of the first spindle 2350. The first spindle 2350 includes a flat main portion (not labeled) and the two threaded ends. The screw cap assembly 2351 includes a first washer 2353, a second washer 2355, and a screw cap 2357. The first washer 2353 includes an annular first body (not labeled), and a third blocking strip 2354 perpendicularly extending from an edge of the first body. The third blocking strip 2354 extends in a direction away from the middle of the first spindle 2350, and corresponds to the first flat fixing hole 2334. The second washer 2355 includes an annular second body (not labeled), and a fourth blocking strip 2356 perpendicularly extending from an edge of the second body. The fourth blocking strip 2356 extends in a direction toward the middle of the first spindle 2350, and corresponds to the second flat fixing hole 2344. That is, the third blocking strip 2354 and the fourth blocking strip 2356 point in opposite directions.

Figure 8:
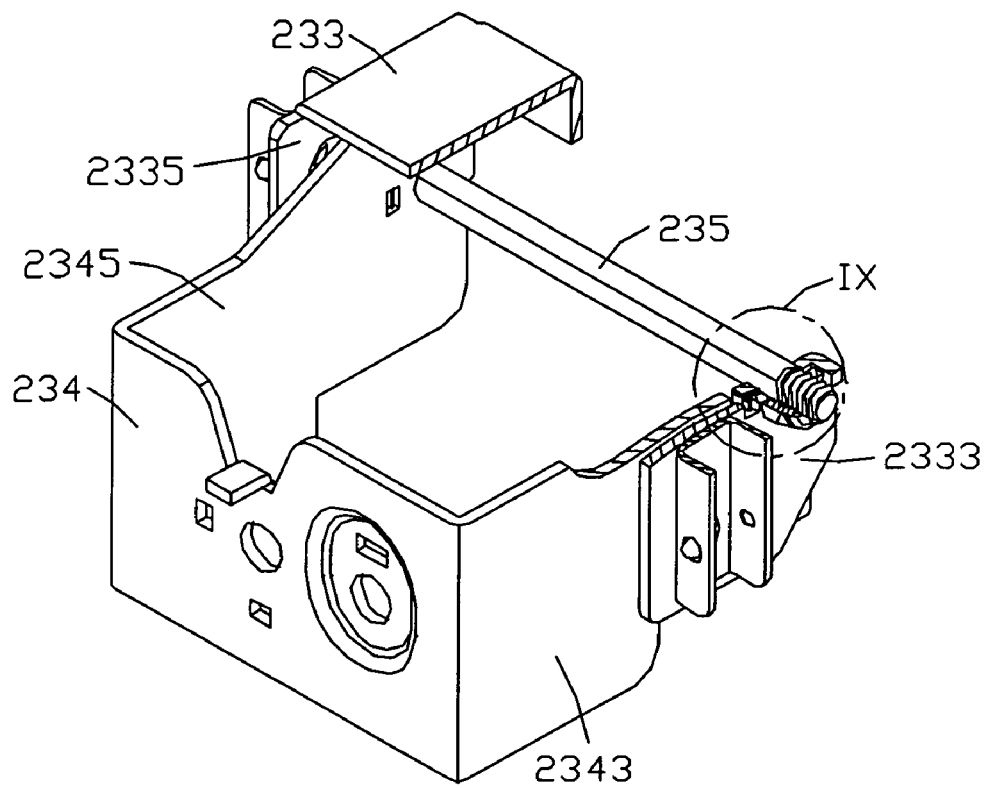
FIG. 8 is an assembled, cutaway view of FIG. 7, showing the hinge attached to the second tilting stand.
Figure 9:
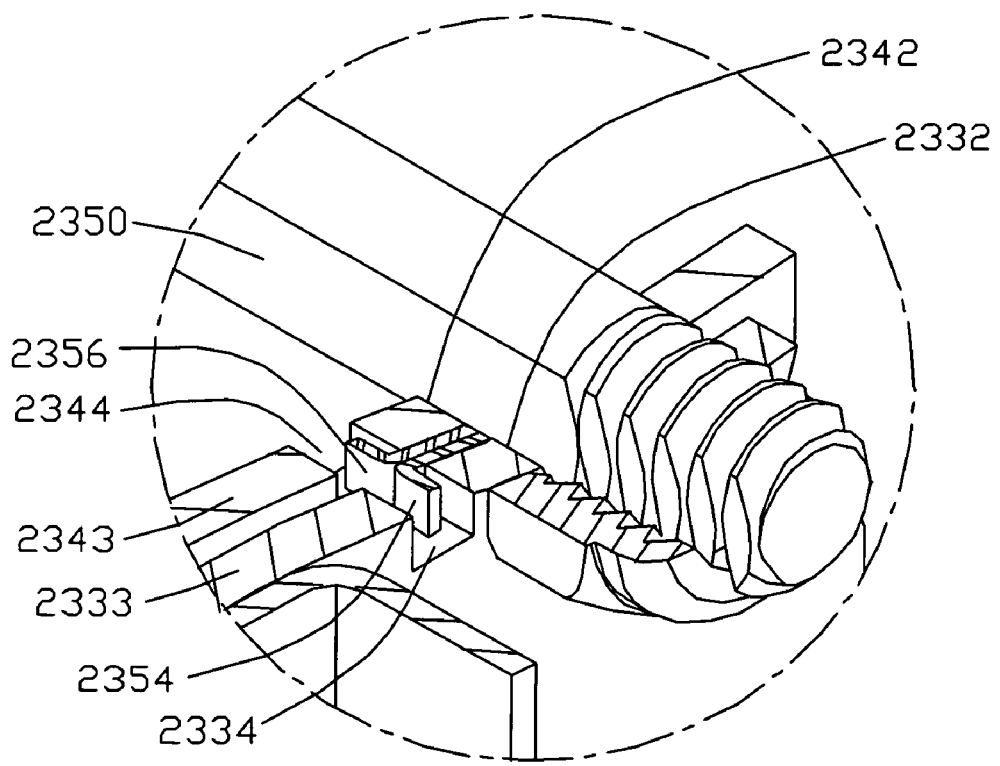
FIG. 9 is an enlarged view of a circled portion IX of FIG. 8.

Referring also to FIG. 8 and FIG. 9, when the hinge 235 is assembled to the second tilting stand 234, the first spindle 2350 extends through the first flat through holes 2332 and the second rounded through holes 2342. One pair of the first and second washers 2353, 2355 are located between the first side board 2333 and the first side wall 2343, the other pair of first and second washers 2353, 2355 are located between the second side board 2335 and the second side wall 2345. The third blocking strips 2354 are received in the first flat fixing holes 2334, and the fourth blocking strips 2356 are received in the second flat fixing holes 2344, respectively. The screw caps 2357 are threadedly engaged to the opposite ends of the first spindle 2350, and are located outside the first side board 2333 and the second side board 2335, respectively. With the above-described configuration, the first spindle 2350 is non-rotatable relative to the first sliding stand 233, and is rotatable relative to the second tilting stand 234. Therefore the second tilting stand 234 can correspondingly move up or down when the first sliding stand 233 moves up or down along the supporting stand 231, and the first sliding stand 233 can remain static relative to the supporting stand 231 when the second tilting stand 234 and the first spindle 2350 are pivoted back or forth relative to the supporting stand 231.

The locking stand 238 is substantially rectangular, and includes a fifth through hole 2381 corresponding to the fourth through hole 2348, a curved sliding groove 2382 corresponding to the second blocking strip 2349, and two sixth through holes 2383 defined in a central portion thereof, respectively. The sliding groove 2382 and the sixth through holes 2383 are located on two opposite sides of the fifth through hole 2381. The locking stand 238 further includes a plurality of seventh through holes (not labeled) defined in four corners thereof such that the display panel 25 can be fixed to the locking stand 238 via the seventh through holes and a plurality of fasteners such as fixing bolts (not shown).

Figure 10:
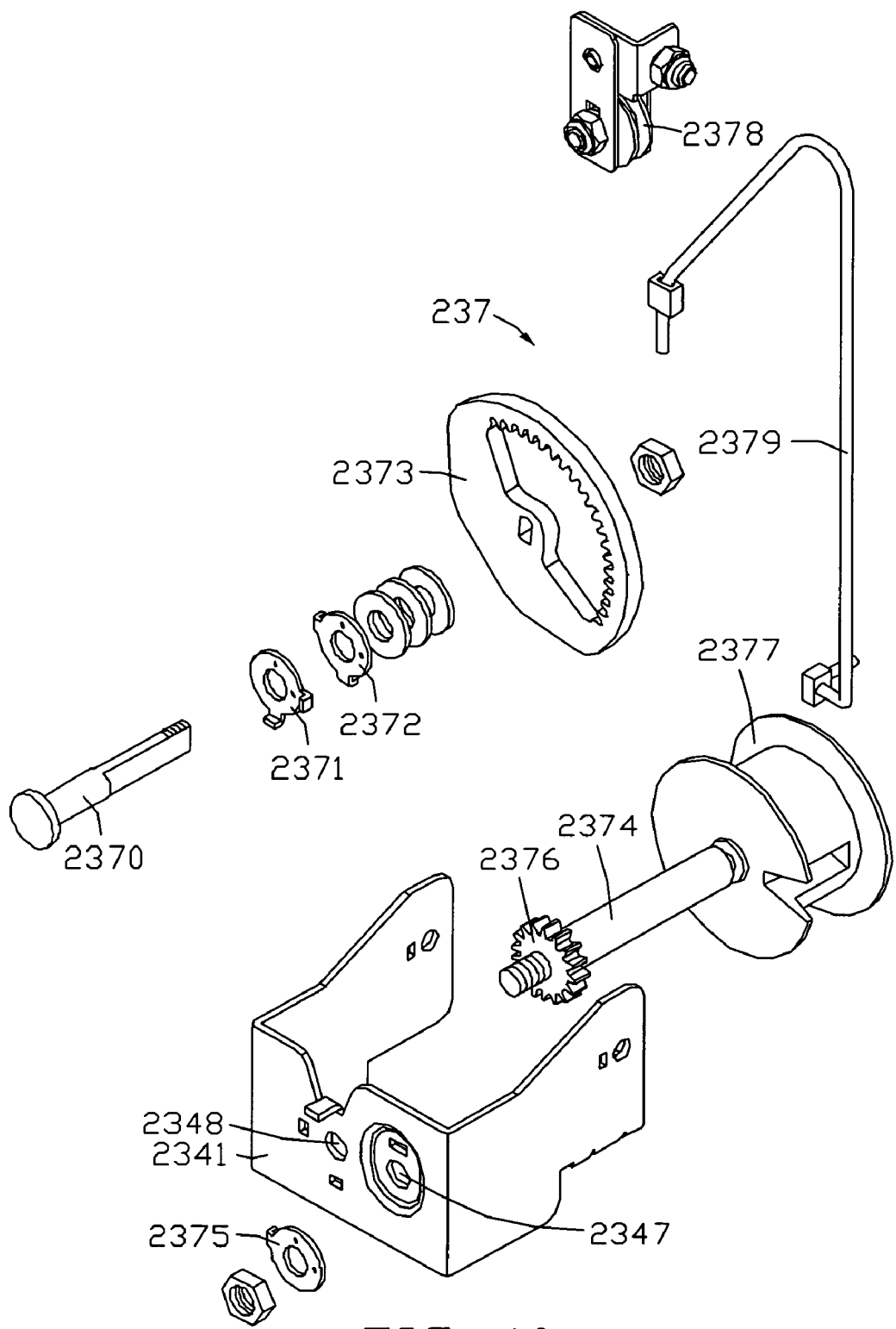
FIG. 10 is an exploded view of the rotating apparatus and the second tilting stand of FIG. 6.

Referring to FIG. 10, the rotating apparatus 237 includes a second spindle 2370, a third washer 2371, a fourth washer 2372, a driving gear 2373, a third spindle 2374, a fifth washer 2375, a driven gear 2376, a rotatable block 2377, a static block 2378, and a connecting line 2379. The driven gear 2376 includes a plurality of first teeth (not labeled) meshed with a plurality of second teeth (not labeled) of the driving gear 2373.

The third washer 2371 includes two fifth blocking strips (not labeled) corresponding to the sixth through holes 2383, respectively. The second spindle 2370 includes an enlarged flat head (not labeled), and a main body (not labeled) connected with the flat head. The main body of the second spindle 2370 includes a flattened and threaded end corresponding to an eighth through hole (not labeled) of the driving gear 2373. When the display device 2 is assembled, the main body of the second spindle 2370 extends through the fifth through hole 2381, the fourth through hole 2348, the third washer 2371, the fourth washer 2372, a plurality of gaskets (not labeled) located between the fourth washer 2372 and the driving gear 2373, and the eighth through hole of the driving gear 2373. A screw cap (not labeled) is threadedly engaged to the threaded end of the second spindle 2370. The fifth blocking strips of the third washer 2371 are non-rotatably received in the sixth through holes 2383, respectively. With the above-described configurations, the second spindle 2370 is non-rotatable relative to the driving gear 2373, and is rotatable relative to locking stand 238. Therefore when the second spindle 2370 is rotated, the driving gear 2373 is correspondingly rotated.

The third spindle 2374 extends through the driven gear 2376 and the rotatable block 2377, and is parallel to the second spindle 2370. The third spindle 2374 is non-rotatable relative to the driven gear 2376 and the rotatable block 2377. A threaded end (not labeled) of the third spindle 2374 extends through the third through hole 2347 and the fifth washer 2375, and is threadedly engaged to a screw cap (not labeled). The fifth washer 2375 includes a sixth blocking strip (not labeled) received in a ninth through hole (not labeled) above the third through hole 2347.

Figure 11:
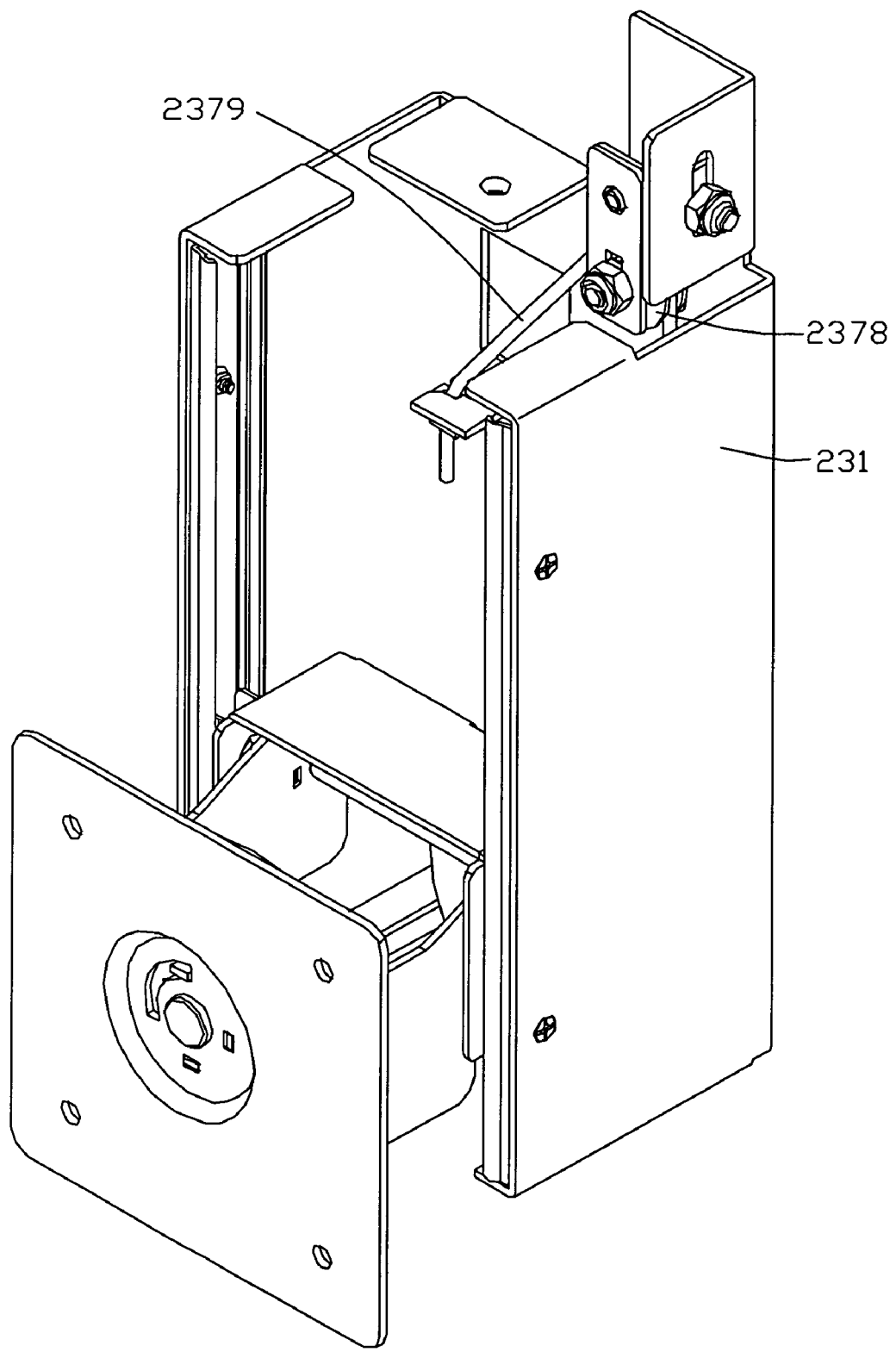
FIG. 11 is similar to FIG. 5, but not showing the lifter.
Figure 12:
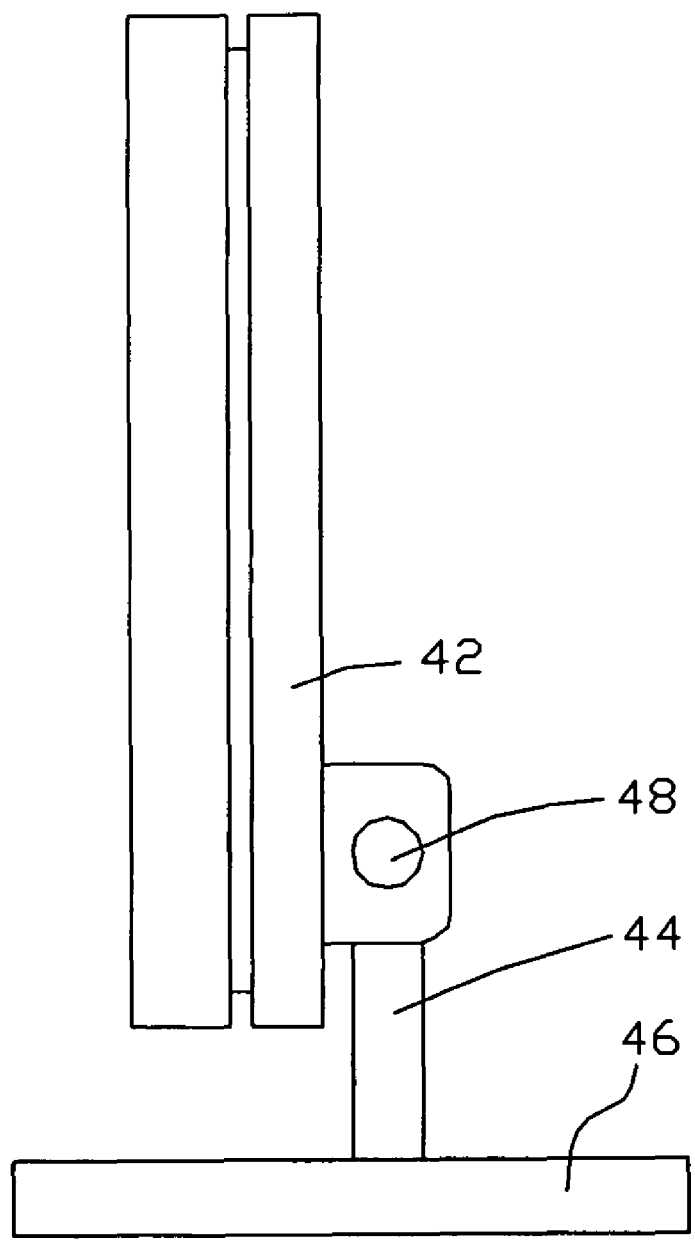
FIG. 12 is a side plan view of a conventional display device.

Referring also to FIG. 11, the static block 2378 is fixed at a top portion of the supporting stand 231. The connecting line 2379 includes one end (not labeled) fixed to the supporting stand 231, and the other end (not labeled) connecting to the rotatable block 2377. A section (not labeled) of the connecting line 2379 is movably received over a top of a pulley wheel (not labeled) of the static block 2378. In the illustrated embodiment, the connecting line 2379 is a kind of flexible cord.

In one use, an external force is applied to the display panel 25 and the locking stand 238 to move the display panel 25 up or down relative to the supporting base 21. As described above, the locking stand 238 moves up or down relative to the supporting base 21, and the first sliding stand 233 correspondingly moves up or down along the supporting stand 231. When the display panel 25 reaches a desired position, the external force is released, and the display panel 25 and the locking stand 238 can remain at the desired position due to a balance of a pulling force from the roller 2391, a static friction force between the first and second sliding guides 2317, 2319 and the first and second sliding arms 2337, 2339, respectively, and related gravitational forces. In addition, the first blocking strip 2312 can limit a maximum height of the display panel 25.

In another use, an external force is applied to the display panel 25 and the locking stand 238 to pivot the display panel 25 back or forth relative to the supporting base 21. As described above, the first sliding stand 233 remains static relative to the supporting stand 231, and the second tilting stand 234 is moved back or forth about the first spindle 2350 correspondingly. When the display panel 25 is pivoted to a desired position, the display panel 25 can remain at the desired position due to a balance of static friction forces between the pairs of first and second washers 2353, 2355.

In a further use, an external force is applied to the display panel 25 and the locking stand 238 to rotate the display panel 25 in the plane substantially perpendicular to the supporting base 21. As described above, the rotation of the locking stand 238 drives the second spindle 2370 to rotate, and the third spindle 2374 and the rotatable block 2377 rotate correspondingly. Therefore, the display panel 25 can be rotated in the plane, and a maximum angle of the rotation of the display panel 25 depends on a length of the sliding groove 2382. When the display panel 25 reaches a desired position, the display panel 25 can remain at the desired position due to a balance of friction forces associated with, inter alia, the meshing connection between the driven gear 2376 and the driving gear 2373. In addition, when the display panel 25 is rotated, the display panel 25 can be driven to move up relative to the supporting base 21 at the same time in the case that one corner of the display panel 25 interferes with the supporting base 21.

In summary, the neck 23 allows the display panel 25 to be moved up or down, pivoted back or forth relative to the supporting base 21, and rotated in the plane substantially perpendicular to the supporting base 21, as desired. Therefore, desired view angles, view heights, and view rotations of the display panel 25 can be conveniently achieved. This enables the display device 2 to readily provide optimum viewing positions for the display panel 25.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A display device comprising:
   a display panel; and
   a rotating apparatus comprising:
   a first spindle assembly comprising a first spindle and a first gear, the first spindle assembly configured to synchronously rotate with rotation of the display panel;
   a connecting assembly connecting to the first spindle assembly, the connecting assembly comprising a spring-loaded roller and a belt, and the belt urging the connecting assembly to rise via the spring-loaded roller; and
   a second spindle assembly comprising a second spindle and a second gear, the second gear meshed with the first gear of the first spindle assembly, the second spindle assembly being configured to be able to rotate and simultaneously rise or fall along the connecting assembly.

2. The display device of claim 1, wherein the first gear of the first spindle assembly comprises a plurality of first teeth, the second gear of the second spindle assembly comprises a plurality of second teeth, and some of the first teeth of the first spindle assembly are meshed with some of the second teeth of the second spindle assembly.

3. The display device of claim 1, wherein the first gear of the first spindle assembly is a driving gear, and the second gear of the second spindle assembly is a driven gear.

4. The display device of claim 1, wherein the second spindle assembly further comprises a rotatable block connecting to one end of a connecting line, the other end of the connecting line being fixed in position.

5. The display device of claim 4, further comprising a static block with a pulley receiving an intermediate portion of the connecting line, wherein when the rotatable block rotates in a first direction, the connecting line wraps around the rotatable block and the second spindle assembly rises; and when the rotatable block rotates in a second direction opposite to the first direction, the connecting line unwraps from the rotatable block and the second spindle assembly falls.

6. The display device of claim 1, further comprising a supporting stand, wherein the first spindle assembly and the second spindle assembly are received in the supporting stand.

7. The display device of claim 6, wherein the supporting stand comprises a first side plate, a second side plate, and a third side plate, the first side plate and the second side plate being located at two opposite sides of the supporting stand, the third side plate interconnecting the first side plate and the third side plate.

8. The display device of claim 7, wherein the supporting stand further comprises a sliding guide fixed at an inner surface of each of the first side plate and the third side plate.

9. The display device of claim 8, further comprising a first sliding stand, wherein the first sliding stand comprises two sliding arms configured to slide up and down along the sliding guides of the supporting stand, respectively.

10. The display device of claim 9, further comprising a second tilting stand and a hinge, wherein the hinge pivotally interconnects the first sliding stand and the second tilting stand, the display panel is connected to the second tilting stand but while being rotatable relative to the second tilting stand, the first spindle and the second spindle extend through the second tilting stand, and the display panel is tiltable about the hinge.

11. The display device of claim 10, further comprising a locking apparatus, wherein the display panel and the first spindle assembly are fixed to the locking apparatus.

12. The display device of claim 11, wherein the locking apparatus comprises a curved sliding groove defined therein.

13. The display device of claim 12, wherein the second tilting stand comprises a stopping protrusion configured to slide along the sliding groove.

14. The display device of claim 13, wherein a maximum angle of the rotation of the display panel depends on a length of the sliding groove.

15. A display device comprising:
   a display panel;
   a supporting stand;
   a first sliding stand received in the supporting stand, and being configured to be movable up or down along the supporting stand;

a second tilting stand received in the supporting stand, and being configured to be pivotable relative to the first sliding stand, the display panel connected to the second tilting stand while being rotatable relative to the second tilting stand; and a rotating apparatus comprising a connecting assembly, the connecting assembly comprising a belt, the belt urging the connecting assembly to rise or fall, wherein the rotating apparatus is configured to allow the display panel to be rotated in a predetermined plane and simultaneously rise or fall along the connecting assembly.

16. The display device of claim 15, wherein the rotating apparatus comprises a first spindle assembly and a second spindle assembly, the first spindle assembly configured to synchronously rotate with rotation of the display panel, the second spindle assembly configured to synchronously rotate with the rotation of the first spindle assembly and cause the display panel to simultaneously rise or fall.

17. The display device of claim 16, wherein the second spindle assembly comprises a second spindle and a rotatable block threadedly engaged to the second spindle, and the rotatable block is non-rotatable relative to the second spindle.

18. The display device of claim 17, wherein the second spindle assembly further comprises a static block and a connecting line, the static block comprises a pulley wheel, the rotatable block is connected to one end of the connecting line, the other end of the connecting line is fixed to the supporting stand, and a section of the connecting line is movably received over a top of the pulley wheel of the static block; and when the rotatable block rotates according to the second spindle in a first direction, the connecting line wraps around the rotatable block and the second spindle assembly rises; and when the rotatable block rotates according to the second spindle in a second direction opposite to the first direction, the connecting line unwraps from the rotatable block and the second spindle assembly falls.

19. The display device of claim 18, wherein the supporting stand comprises a first side plate, a second side plate, and a third side plate, the first side plate and the second side plate are located at two opposite sides of the supporting stand, the third side plate interconnects the first side plate and the third side plate, a stopping protrusion inwardly extends from the third side plate of the supporting stand, and one end of the connecting line is fixed to the stopping protrusion of the supporting stand.

20. A display device comprising:
a display panel; and
a rotating apparatus comprising:
    a first spindle assembly comprising a first spindle and a first gear, the first spindle assembly configured to synchronously rotate with rotation of the display panel;
    a connecting assembly connecting to the first spindle assembly;
    a second spindle assembly comprising a second spindle and a second gear, the second gear meshed with the first gear of the first spindle assembly, the second spindle assembly being configured to be able to rotate and simultaneously rise or fall along the connecting assembly; and
a supporting stand comprising a first side plate; a second side plate, a third side plate and two sliding guides, the first side plate and the second side plate being located at two opposite sides of the supporting stand, the third side plate interconnecting the first side plate and the third side plate, and the sliding guides fixed at an inner surface of each of the first side plate and the third side plate, respectively;
a first sliding stand comprising two sliding arms configured to slide up and down along the sliding guides of the supporting stand, respectively;
a second tilting stand;
a hinge, pivotally interconnecting the first sliding stand and the second tilting stand;
a locking apparatus comprising a curved sliding groove defined therein;
wherein the first spindle assembly and the second spindle assembly are received in the supporting stand, the display panel and the first spindle assembly are fixed to the locking apparatus, the display panel is connected to the second tilting stand but is rotatable relative to the second tilting stand, the first spindle and the second spindle extend through the second tilting stand, and the display panel is tiltable about the hinge.

* * * * *